US 8,498,223 B2

(12) United States Patent
Kavanaugh

(10) Patent No.: US 8,498,223 B2
(45) Date of Patent: Jul. 30, 2013

(54) SYSTEMS AND METHODS FOR PROVIDING EMERGENCY SERVICE TRUST IN PACKET DATA NETWORKS

(75) Inventor: Richard Thomas Kavanaugh, Encinitas, CA (US)

(73) Assignee: Sierra Wireless, Inc., Richmond, British Columbia (CA)

( * ) Notice: Subject to any disclaimer, the term of this patent is extended or adjusted under 35 U.S.C. 154(b) by 1232 days.

(21) Appl. No.: 12/193,255

(22) Filed: Aug. 18, 2008

(65) Prior Publication Data

US 2009/0141707 A1  Jun. 4, 2009

Related U.S. Application Data

(60) Provisional application No. 60/965,215, filed on Aug. 16, 2007.

(51) Int. Cl.
  *H04L 12/28*  (2006.01)
(52) U.S. Cl.
  USPC ................................. 370/254; 709/227; 726/1
(58) Field of Classification Search
  None
  See application file for complete search history.

(56) References Cited

U.S. PATENT DOCUMENTS

| 7,123,693 | B2 | 10/2006 | Nelson et al. |
| 2005/0201359 | A1* | 9/2005 | Nelson et al. ................. 370/352 |
| 2005/0201529 | A1 | 9/2005 | Nelson et al. |
| 2006/0123479 | A1 | 6/2006 | Kumar et al. |
| 2007/0121596 | A1 | 5/2007 | Kurapati et al. |

FOREIGN PATENT DOCUMENTS

WO  2007010377 A3  3/2007

OTHER PUBLICATIONS

Korean Office Action in Application No. 10-2010-7005481, dated Apr. 20, 2011.
Korean Notice of Allowance in Application No. 10-2010-7005481, dated Feb. 16, 2012.
International Search Report and Written Opinion in International Application No. PCT/US08/073514, mailed Nov. 3, 2008.
PRC Office Action in Application No. 200880103624.9, dated Aug. 3, 2012.
PRC Search Report in Application No. 200880103624.9, dated Jul. 26, 2012.

* cited by examiner

*Primary Examiner* — Kevin C Harper
(74) *Attorney, Agent, or Firm* — Nixon Peabody LLP

(57) ABSTRACT

A method and apparatus for providing in a packet data telecommunication network serving one or more end terminals and/or Mobile Stations (MSs), a method for establishing, managing, modifying, and terminating an End-to-End (E2E) Emergency Service (ES) Chain-of-Trust (CoT) from an Access Serving Network (ASN) and Connectivity Service Network (CSN) to a PSAP, PSAP proxy, or PSAP (i.e. PSTN) gateway that results in the creation of a trust relationship amongst the components in the established ES CoT necessary to allow or validate the granting of any unauthenticated or unprovisioned ES network access and ES operation establishment, modification, and termination requests from amongst the components in an ES CoT to assist a particular terminal/MS or ES network component attempting to establish an ES session between the ES user agent of the terminal/MS and a serving PSAP.

45 Claims, 7 Drawing Sheets

SYSTEMS AND METHODS FOR PROVIDING EMERGENCY SERVICE TRUST IN PACKET DATA NETWORKS

CROSS-REFERENCE TO RELATED APPLICATIONS

This application claims benefit of the U.S. Provisional Application Ser. No. 60/965,215, filed on Aug. 16, 2007, which is incorporated by referenced herein.

TECHNICAL FIELD

The present disclosure relates generally to wireless communication systems and more specifically to system and method for providing trusted emergency connection.

BACKGROUND

Telecommunications Emergency Services (ES) include providing for or assisting with connecting a user of a wired or wireless telecommunication device to a geographically appropriate Public Safety Answering Point (PSAP) to provide emergency assistance to the user during their emergency situation. These ES capabilities may include but are not limited to, providing unrestricted, seamless, ubiquitous, and reliable end-to-end emergency session access between the user terminal/Mobile Station (MS) and the appropriate PSAP, geographically appropriate PSAP determination based on the current location of the terminal/MS, terminal/MS location determination assistance, terminal/MS location callback assistance, and emergency communication traffic priority and high-quality network resource reservation over non-emergency communication traffic.

Providing the various networking functionality, systems, and infrastructures to support the aforementioned ES features has been largely met for wired and wireless circuit switched based communications. However, with the emergence of new packet data (i.e. IP-based/enabled) networks, infrastructures, and services, these new technologies present many challenges in order to provide the same level of unrestricted, seamless, ubiquitous, and reliable end-to-end infrastructure for ES that is available today for circuit switched communications.

Some of these said challenges have been met in a limited sense, particularly for certain IP-based Emergency Services that are managed closely by or directly associated with an IP-enabled Access Service Network (ASN) and/or Connectivity Service Network (CSN) for which the terminal or MS is subscribed and/or associated with. Certain methods are in use or currently being designed and deployed to assist with this limited IP-based ES support.

IP-based rule hotlining is one method being used or in deployment to assist with IP-based ES support. Rule based hotlining provides a method for a network to restrict the network access of a terminal/MS to just a limited set of destinations. In the case of ES, rule based hotlining can be used to restrict a terminal/MS that is not subscribed or authenticated for network access over the ASN and/or CSN to still receive network access for ES. Alternatively, rule based hotlining can restrict the terminal/MS in an emergency mode of operation, for transmitting and receiving non-ES related traffic that may impact the ability to maintain the ES in use that triggered the ES hotline to the terminal/MS in the first place.

High Quality-of-Service (QoS) Service Flow (SF) establishment is another method being used or in deployment to assist with IP-based ES support. High QoS SF establishment provides a method for a network to guarantee a certain level of performance to a data flow associated, or classified, with the established SF. For ES, QoS guarantees are important if the network capacity is limited by static or dynamic network conditions. If a high QoS SF is established for a terminal/MS in an emergency situation where the network is under heavy loading relative to the capacity of the network to meet the required quality needs of the ES, a high QoS SF can be established to classify and prioritize the communication traffic associated with the ES in use by the terminal/MS.

In both the cases of rule based Hotlining and high QoS SF operation, a trigger request to configure and establish these methods, whether for ES or non-ES traffic, must be well trusted in order to prevent malicious use of these tools for theft-of-service, denial-of-service attacks, identity theft, and general data theft. This trust is dependent on the relationship and association between the network entity executing the operation (e.g. the ASN or CSN) and the network entity originating the operation request or forwarding it as a proxy on behalf of the originator or anther proxy.

A service can be classified into two categories. The first category is a service that is directly associated with the network element executing an operation, say the ASN for sake of example, on behalf of the service requesting it. This direct association may result from the fact that the service is owned and fully managed by the ASN so the trust can be implied since the ASN is responsible for both the trigger and the execution of the operation being requested. The said direct association could also result from a service agreement between the ASN and the provider of the service so that the trust is agreed upon and assumed as terms of the service agreement by the ASN performing the operation and the provider of the service sending the operation trigger. For this first category of services, it is relatively easy today for a strong trust relationship to be established between the service and the serving ASN, given the said direct association between these two elements, to determine the validity of a request, such as a QoS SF or hotline operation request, to be performed by the ASN on behalf of the service and terminal/MS utilizing the service.

The second category of a service is one which is neither directly associated with the network element executing the operation (e.g. the ASN or CSN) nor directly associated with an aforementioned service agreement. For this class of services, trust cannot be assumed by the ASN or CSN and thus must be determined programmatically. For this second category of services, it is today difficult to establish a strong trust relationship between the unassociated service and the serving ASN or CSN in order to determine the validity of a request to be performed by the ASN or CSN on behalf of the service and terminal/MS utilizing the service.

This second category of service can occur frequently in two different scenarios. The first scenario can occur when the user subscribes with an Application Service Provider (ASP) to an independent service with no association with the user's network (e.g. ASN/CSN) subscription that is used to access the service over the subscribed terminal or MS. One example of this scenario is a user who subscribes to an ASP IP-based VoIP service that does not provide network connectivity for the user to access the service. The second scenario occurs when the user is subscribed to a service that is directly associated with their home network provider but the user's terminal or MS is currently roaming on a visited network that does not have the necessary service agreement with the user's subscribed home network to create an association between the home network's services and the visited network.

Emergency Services in IP-enabled networks are impacted by these aforementioned trust limitations for an unassociated service in that, due to regulatory requirements and/or the altruistic desires of the ASN/CSN providers to provide unrestricted, seamless, ubiquitous, and reliable end-to-end ES capabilities, the ASN/CSN providers will need to take into consideration both the trust requirements for associated and non-associated categories of Emergency Services in order to provide capable ES support for both said categories of services while not compromising the ASN, CSN, and other network elements to the aforementioned risks that are possible with a malicious terminal/MS or ES.

In addition to the trust concerns for a non-associated ES, ASN and CSN providers must also take into consideration the trust issues that get introduced for both associated and non-associated services when the route of the control and/or data plane signaling between the execution point of the ES operation (e.g. ASN or CSN) and the trigger originator or proxy is altered or hidden through general common practice networking methods such as Virtual Private Network (VPN) tunnels, which can cause route tunneling, encapsulation, and/or encryption, Network Address Translation (NAT), deployed in network elements such as firewalls and Consumer Premise Equipment (CPE) routers for Small Office Home Office (SOHO) and other small local networks, and ASN/CSN roaming, where the terminal/MS may be attempting to access the home-network's associated ES but for which the ASN/CSN of the roaming network providing the general data connectivity does not have a direct or agreed upon relationship with the associated ES of the home network of the terminal/MS.

OVERVIEW

In accordance with one example embodiment, in a packet data network serving one or more end terminals and/or Mobile Stations (MSs), a method for establishing, managing, modifying, and terminating an End-to-End (E2E) Emergency Service (ES) Chain-of-Trust (CoT) from an Access Serving Network (ASN) and Connectivity Service Network (CSN) to a PSAP, PSAP proxy, or PSAP (i.e. PSTN) gateway that results in the creation of a trust relationship amongst the components in the established ES CoT necessary to allow or validate the granting of any unauthenticated or unprovisioned ES network access and ES operation establishment, modification, and termination requests from amongst the components in an ES CoT to assist a particular terminal/MS or ES network component attempting to establish an ES session between the ES user agent of the terminal/MS and a serving PSAP.

BRIEF DESCRIPTION OF THE DRAWINGS

The invention may be best understood by referring to the following description and accompanying drawings that are used to illustrate embodiments of the invention. In the drawings.

DETAILED DESCRIPTION OF EXAMPLE EMBODIMENTS

Figure 1:
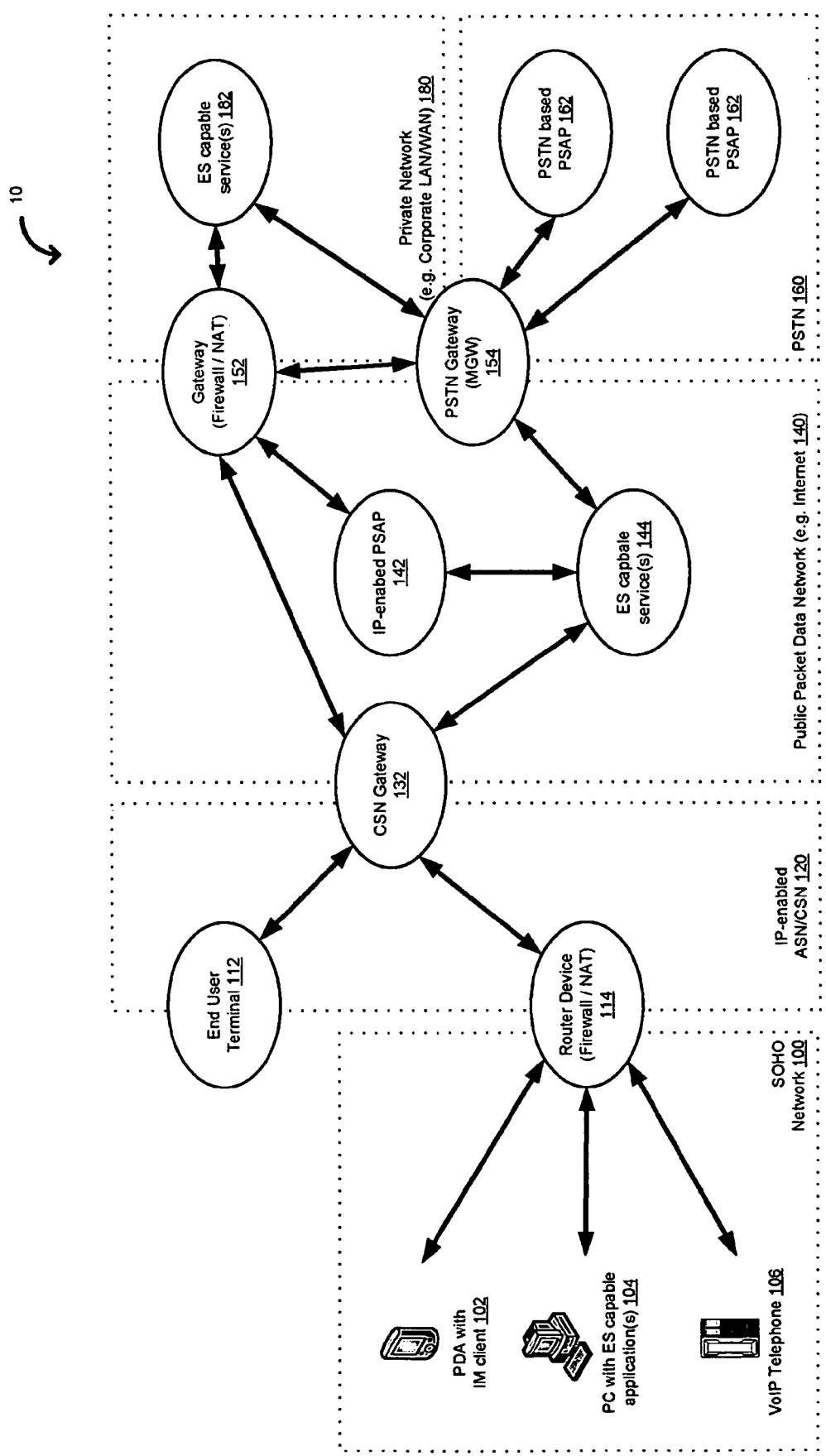
FIG. 1 illustrates a simplified exemplary block diagram of the major interconnected networks and network elements in accordance with one embodiment.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice the present invention. In other instances, well-known computing systems, communication and data collection devices are shown in block diagram form to avoid obscuring the present invention. In the following description of the embodiments, substantially the same parts are denoted by the same reference numerals.

FIG. 1 illustrates a simplified block diagram of one example embodiment of a system of major interconnected networks and network elements in which an Emergency Service (ES) Chain-of-Trust (CoT) connection may be established in accordance with principles disclosed herein. The system 10 includes a small office/home office (SOHO) network 100, which may include one or more mobile stations (MS), such as PDA with IM client 102, PC with ES capable applications 104, VoIP telephones 106 and other communication devices. The system further includes IP-enabled Access Serving Network (ASN) and Connectivity Service Network (CSN) 120 having one or more end user terminals 112, router device 114, such as a firewall or Name Address Translation (NAT) device, which provide interface with the SOHO network devices, and a CSN gateway 132. The system 10 further includes a public packet data network 140, such as the Internet. The network 140 may include one or more IP-enabled Public Safety Answering Points (PSAP) 142 and various ES capable services 144. The system 10 further includes a Public Switched Telephone Network (PSTN) 160, which may include one or more PSTN-based PSAPs 162. The PSTN 160 may interface with the public packet data network 140 via a PSTN gateway 154 or other types of network elements. The system 10 further includes a private network 180, such as a corporate LAN or WAN, which may include various ES capable services 182. Private network 180 may interface with the public packet data network 140 via a gateway 152, such as a firewall or NAT 152. The system 10 is not limited to the depicted telecommunication networks and network elements and may include other types of network elements interconnected in various network configurations known to those of ordinary skill in the art.

Figure 2:
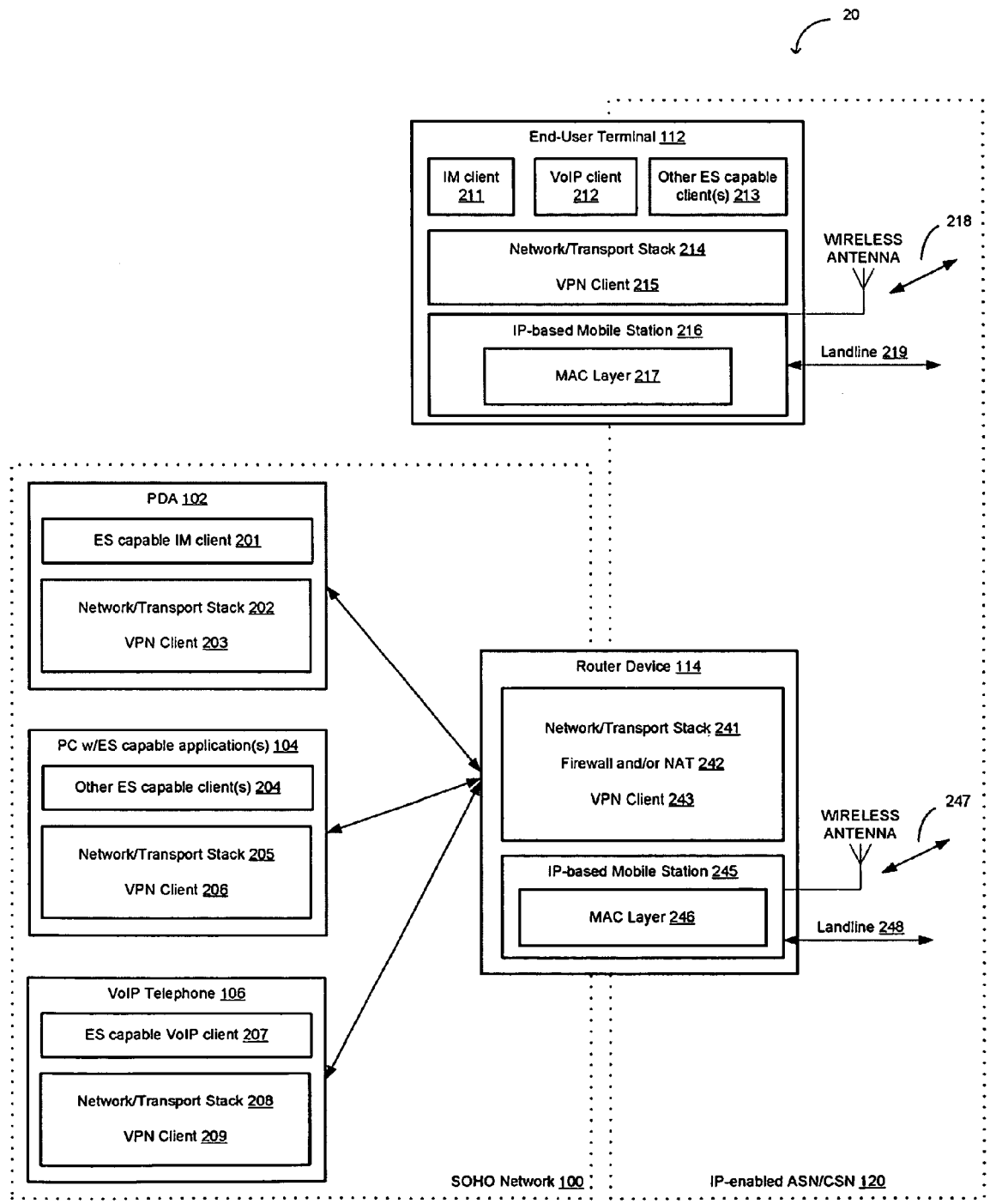
FIG. 2 illustrates an exemplary block diagram of the packet data based network access, connectivity and local networks and associated router and terminal devices in accordance with one embodiment.

FIG. 2 illustrates an exemplary block diagram of the packet data based network access, connectivity and local networks and associated router and terminal devices in accordance with one embodiment. As depicted, the SOHO 100 may include a PDA 102, PC 104, VoIP telephone 106 or other types of mobile stations. In order for these mobile stations to establish a trusted emergency connection with a PSAP, they may have the following software components installed thereon. The PDA 102 may have a ES capable IM client 201, Network/Transport stack 202 and virtual private network (VPN) client 203. The PC 104 may have an ES capable client 104, Network/Transport stack 204 and VPN client 206. The VoIP telephone 106 may include ES capable VoIP client 207, Network/Transport tack 208 and VPN client 209. The SOHO network 100 may include other ES enabled devices having other software components installed thereon.

A router devices 114 may be provided to interface SOHO network 100 with the IP-enabled ASN/CSN 120. The router 114 may include Network/Transport stack 241, firewall/NAT device 242, VPN client 243 and 1P-based mobile station 245 having MAC layer 246, which provides wired network interface 248 and/or wireless network interface 247. The ASN/CSN network 120 may also include one or more end user terminals 112. Each terminal may include an IP client 211, VoIP client 212, and other ES capable clients 213. The terminal 112 may also include Network/Transport stack 214, VPN client 215 and PP-based mobile station 216 having MAC layer 217, which provides wired network interface 219 and or wireless network interface 218. The ASN/CSN network 120 may include other ES enabled devices known to those of ordinary skill in the art.

Figure 3:
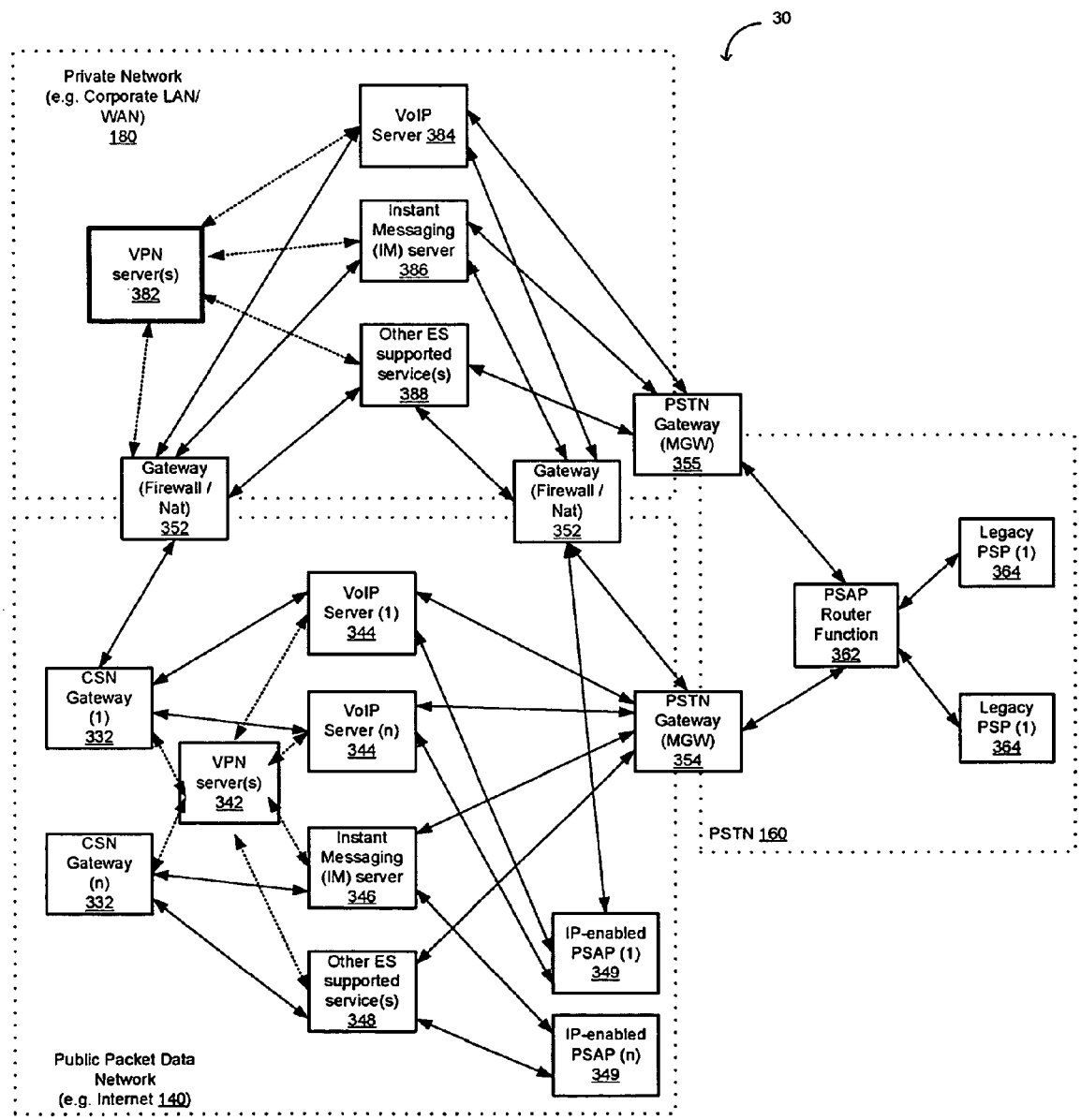
FIG. 3 illustrates an exemplary block diagram of the private and public packet data networks and a PSTN network and their corresponding network elements in accordance with one embodiment.

FIG. 3 illustrates an exemplary block diagram of the private and public packet data networks and a PSTN network and their corresponding network elements in accordance with one embodiment. Public packet data network 140 may include one or more CSN gateways 332, VPN server 345, one or more VoIP servers 344, instant messaging (IM) server 346 and other ES supported services 348, as well as one or more IP-enabled PSAPs 349. The public packet data network 140 may interface with the PSTN 160 using PSTN gateway 354. The PSTN 160 may include PSAP router functions 362 and one or more legacy PSAP 364. The private network 180 may include VPN server 382, one or more VoIP servers 364, IM server 386 and other ES supported services 388. The private network 180 may interface with the public packet data network 140 through one or more gateways 352 and with the PSTN 160 via a PSTN gateway 355.

Next, disclosed are several example embodiments of methods for establishing, managing, modifying and terminating an Emergency Service (ES) Chain-of-Trust (CoT) from the ASN and CSN, serving the terminal/Mobile Station (MS) of a user assumed to be in an emergency situation, to a PSAP 162, PSAP gateway 154 or PSAP proxy and to use such established ES CoT for validating, at the terminating point(s) of execution of the requested ES operation (e.g. ASN/CSN), the trust necessary in order to grant the execution of the requested ES operation by the necessary ES CoT component(s). Said ES operation requests being passed along the ES CoT to the terminating point(s) of execution from any service, proxy, terminal, mobile station, ES capable user agent, or router that triggers, originates, actively reroutes/forwards, modifies, or extends the ES operation request. A particular ES CoT comprises all the key active routing components that provide the ES IP-based network connectivity along both the control and data plane routing for a particular terminal/MS to form an end-to-end (E2E) link from the serving ASN of the terminal/MS to the selected PSAP selected to service the current emergency situation of the user and their terminal/MS. The actual terminal/MS with a user in an emergency situation and a legacy non-IP enabled serving PSAP may be implied members of the ES CoT assuming the corresponding ASN and PSAP gateway or proxy has an out-of-band method for guaranteeing trust with these E2E terminating components of the ES in use.

The establishment or modification of the said ES CoT comprises one or more network elements, such as servers, routers, gateways, etc., determining independently or in conjunction that a terminal/MS is attempting to access the ES capabilities of a networking service. Said determination thus triggers one or more of the said network elements to trigger the establishment or modification of an ES CoT. Said trigger may be initiated through an uplink manner, triggered from the terminal, MS, CPE, ES user agent, and/or the serving ASN, through a downlink manner, triggered from the PSAP directly or through a PSAP proxy or gateway, or through an intermediate manner, triggered from one of the intermediate CoT components along the ES CoT to be established. If said ES CoT establishment is triggered from multiple network elements in the ES CoT to be established, they may link up into a combined and single ES CoT for which the parallel triggers helps to expedite the full establishment of the ES CoT.

In one example embodiment, the said modification of the ES CoT is determined from and triggered by the handoff procedure of a terminal/MS from a first serving ASN/CSN to a secondary serving ASN/CSN.

To complete an establishing or changing ES CoT, each CoT component, or link, in the establishing ES CoT must be triggered to and be capable of ascertaining the links to other CoT components in the establishing ES CoT for which it will have a direct ES CoT link to, at least one in each direction along the E2E link unless separate links are required in one or both directions for control and data plane management of the intended ES session traffic. Once said ES CoT direct links are ascertained, the CoT components then attempt to authenticate the ES accreditation of these linked ES CoT components to move towards completing the establishment or modification of an E2E ES CoT.

Said trigger and method to ascertain the direct links of an establishing or changing ES CoT from a particular CoT component is dependent on the type of component and its capabilities. In one example embodiment, said trigger and link attainment is derived through the interception by a first CoT component of a session establishment request (e.g. SIP INVITE) or modification that includes an indication, tag, marker, or argument, that the session of the service to be established or modified is intended to be used for emergency purposes. In this embodiment, the interception of the ES session establishment is the trigger in the first CoT component and the links of the secondary CoT components to be authenticated for ES CoT accreditation can be determined by the source and destination (e.g. data link, MAC, network, session layer source and destinations) of the intercepted request with the ES indication.

In another example embodiment, said trigger and link attainment is derived through the reception by a first CoT component from a secondary CoT component of an ES CoT trust validation request, thus implicitly indicating to the first CoT component it is to be included in an ES CoT and must reciprocally authenticate the ES CoT accreditation of the secondary CoT component for which it has the destination for in the received ES CoT trust validation request.

In yet another example embodiment, said link attainment can be implied by a first CoT component for a third CoT component after receiving a request for an ES CoT trust validation request by a secondary CoT component when said third CoT component is directly associated with said first CoT component (e.g. VoIP client and VoIP server, VPN client and VPN server) when it is assumed by the first CoT component that the associated third CoT component must also be part of the establishing or changing ES CoT in order to complete the E2E ES CoT.

In this aspect, a secure method to establish, modify, and terminate an ES CoT is provided by utilizing a Public Key Infrastructure (PKI), such as employing the use of certificates for where each ES CoT component is assigned a certificate associated with a root certificate authority acting as or on the behalf of an ES component accreditation authority. Said accreditation authority is composed of either a single worldwide ES regulatory and accreditation regime or a patch work of regional and/or complementary ES regulatory and accreditation regimes. The ES component accreditation authority, issues a revocable ES certification (e.g. an ES certificate) to each component that can demonstrate it can be trusted to request, forward, modify, and/or perform an ES request in the spirit of a ES compliant and non-malicious ES networking element that shall not use such trust to perform malicious activities made possible through the granting of a requested ES operation. In this aspect, the issued ES certificate of a first ES accredited component is used by a second ES component to authenticate the ES accreditation of the first ES component during the establishment of an ES CoT.

Said methods of ES certificate issuance and validation may also provides a mechanism to guarantee the integrity and/or confidentiality of said ES operation and ES CoT messaging, once an ES CoT is initialed established between two direct links.

Said ES accreditation authority, upon determination of an ES component performing malicious activity associated with requested ES operations, will have the right and capability to take the appropriate action to prevent future occurrences of the malicious ES related activities. In one embodiment, the ES accreditation authority adds the certificate of a malicious first ES component to a Certificate Revocation List (CRL) to be used, directly or indirectly through a request to a trusted ES Online Certificate Status Protocol (OCSP) responder, by a second ES component during an ES CoT establishment or modification to determine the ES accreditation of the first ES component is no longer valid. Said determination of an accredited ES component performing malicious ES activity is assisted through the reporting of the malicious ES activity from other accredited ES components, other general network components, application and network service providers, or PSAPs to the ES accreditation authority.

Alternatively, a secure method to establish, modify, and terminate an ES CoT may be provided by utilizing a web-of-trust model for a decentralized approach to component accreditation in accordance with another example embodiment.

The ES operation requests, for which the present invention provides trust for, includes but is not limited to requests to establish, modify, and terminate ES rule based Hotline operations and ES high Quality-of-Service (QoS) Service Flows (SF) operations, thus summarily referred to as ES Hotline and QoS SF (ESHSF) operations. Through utilization of the ES CoT methods of the present invention, received ESHSF and other ES related operations that require a high degree of trust on their authenticity and non-malicious intent and integrity can be seamlessly validated and executed by the network element(s) at the terminating point(s) of execution of the operation.

In this aspect, said trust validation can be concluded regardless of whether or not the CoT component triggering the initial ES operation request or the services, proxies, gateways, etc. that actively forward and possibly modify the ES request are directly associated with the serving ASN, CSN, or other ES CoT element (e.g. VoIP server) targeted to execute the ES operation(s). Said trust being due to the fact that the established ES CoT creates an inherited trusted association along the E2E link(s) of the ES CoT that can be used for validation instead of a direct trust association, for which may not exist, between the component requesting the ES operation and the component targeted to execute the operation. In addition, a first CoT component only needs to know its directly linked secondary ES CoT component have been validated for ES trust and thus can request, forward, and execute ES request operation(s) and ES CoT modification, or termination requests sent to or received by the first CoT component's directly linked secondary CoT components due to the assumption that each link in the established ES CoT will validate the corresponding direct link(s) in the ES CoT before allowing an ES request operation to be executed or forwarded by said link.

Said inherited trust along the E2E link of an established ES CoT can be concluded based upon the fact that each and every component, or link, in the established ES CoT is responsible for and guaranteed to have validated each of the other components of the same established ES CoT for which the specific component has a direct link to as part of the overall end-to-end link of the specific ES CoT. Said guarantee is based on the fact that each component in an established ES CoT can be certified and accredited to always validate the direct components for which it is linked directly to through an ES CoT, or report a validation error if the validation fails, and to not maliciously request or manipulate any ES operation requests. Said certification and accreditation is employed through the use of secure capabilities of the security mechanism, PKI, web-of-trust, or otherwise, that is deployed, maintained, and governed through one or more regulated ES accreditation authorities who shall be responsible for certifying and accrediting components that meet the ES CoT requirements and revoking certification and accreditation for previously certified and accredited ES CoT components that are found to no longer meet the minimum ES CoT requirements.

In another example embodiment, a method is provided to solve the aforementioned limitations in such said networks to reliably deliver an ES operation trigger request to the serving ASN when VPN tunneling or other similar techniques may be preventing the ASN from receiving the requests directly from ES servers or proxies. Said method employs the use of ES operation request content altering by the serving VPN client and/or server to include the path of the VPN tunnel into the routes associated and specified by the ES operation request and a MAC layer (layer 2) relay mechanism between the terminal or MS and the serving ASN to forward ESHSF request/response messaging, ES CoT request/response messaging, and other general MS-to-ASN messaging that cannot be sent/received directly by the serving ASN due to the tunnel effect of the IP traffic by the current VPN session.

In yet another example embodiment, a method is provided to grant an unauthenticated and/or unsubscribed leap-of-faith (LoF) access to a MS and/or terminal claiming access is required for ES activities by allowing the access without validity of the ES request initially but for which can be verified quickly thereafter depending upon the result of a ES CoT establishment attempt or lack thereof. Said method provides a mechanism to give user or device the benefit of the doubt to allow quick ES access while still allowing tracking of malicious ES activity that can be acted upon with the appropriate level of retaliation depending upon the situation and the ES regulatory restrictions and guidelines of the operating region.

In yet another example embodiment, a method is provided where the unsubscribed ASN does NOT need to grant the user a leap-of-faith (LoF) access to a MS requesting ES. In this case, the MS includes the IP addresses of the servers that it needs to communicate with to complete its ES communications. The ASN then contacts these servers and generates the required CoT with these servers. Only after the CoT and ES setup operation requests (e.g. Hotline rules) are setup is the MS allowed access to the requested servers. The MS can also provide IP address of additional servers to modify the Hotline rules and add more servers to the CoT after the initial CoT has been established.

Figure 4:
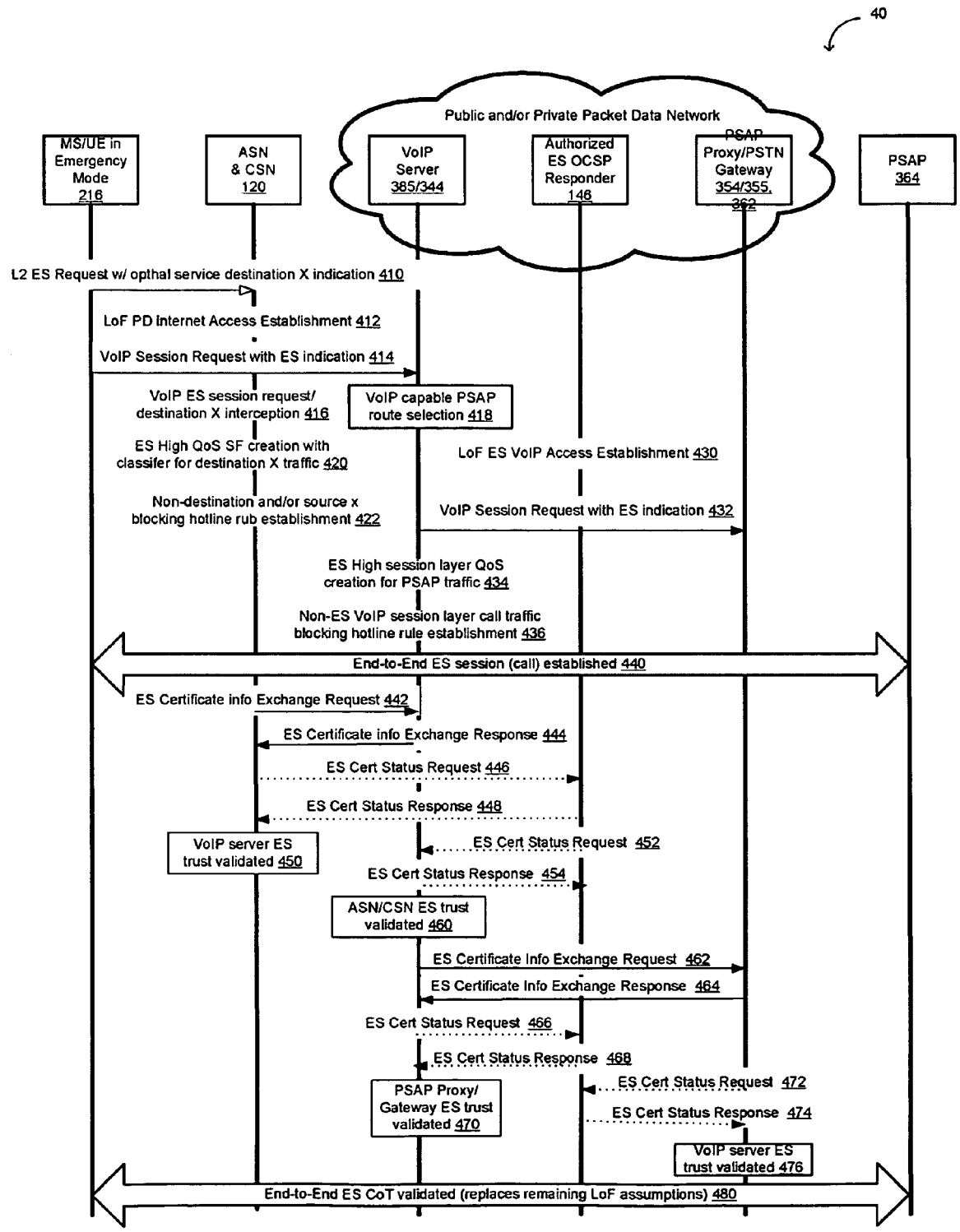
FIG. 4 illustrates a message flow diagram of the messages utilized to establish an ES CoT in an uplink manner from the serving ASN/CSN to a PSAP gateway (i.e. PSTN) triggered by an ES indication and service route destination interception from the MS in accordance with one example embodiment.

FIG. 4 illustrates a message flow diagram of the messages utilized to establish an ES CoT in an uplink manner from the serving ASN/CSN to a PSAP gateway (i.e. PSTN) triggered by an ES indication and service route destination interception from the MS in accordance with one example embodiment. At step 410, the user terminal/MS 216 in the emergency mode establishes layer 2 (MAC layer) connection with the ASN/CSN 120 by sending an ES request with optional service destination X indication. At step 412, user terminal/MS 216 performs loss of frame alignment (LOF) packet data (PD) internet access establishment. At step 414, user terminal/MS 216 sends to the VoIP servers 384 or 344 VoIP session request with ES indication. At step 416, ASN/CSN intercepts the VoIP ES session request to destination X. At step 418, VoIP server 384/344 selects VoIP capable PSAP router. At step 420, ASN/CSN 130 creates an ES High Quality-of-Service (QoS) Service Flow (SF) with classifier for destination X traffic. At step 422, ASN/CSN 130 establishes non-destination and/or source X blocking Hotline rub. At step 430, the authorized ES Online Certificate Status Protocol (OCSP) responder 146 establishes a LoF ES VoIP access 430 to PSAP Proxy 362 or PSTN gateway 354/355. At step 432, VoIP server 384/344 sends a VoIP session request with ES indication to the PSAP proxy 362 or PSTN gateway 354/355. At step 434, VoIP server 384/344 creates a ES High session layer QoS channel for PSAP traffic. At step 436, VoIP server 384/344 establishes non-ES VoIP session layer call traffic blocking hotline rules. At step 440 an end-to-end ES session call between the user terminal/MS 216 and PSAP 364 is established. At steps 442 and 444, ASN/CSN 120 and VoIP server 394/344 exchange the ES certificate info. At optional steps 446 and 448, ASN/CSN 120 requests and receives from the authorized ES OSCP responder 146 ES certificate status information. At step 450, ASN/CSN 120 validates VoIP server 385/344 ES trust. At optional steps 452 and 454, VoIP server 385/344 requests and receives ES certificate status info from the authorized ES OCSP responder 146. At step 460, VoIP server 384/344 validates ES trust with ASN/CSN 120. At steps 462 and 464, VoIP server 384/344 exchanges ES certification information with PSAP proxy 364 or PSTN gateway 354/355 and, at steps 466 and 468, may optionally request/receive ES certificate status info from the Authorized ES OCSP responder 146, if have not done so before. At step 470, VoIP server 384/344 validates ES trust with PSAP proxy 364 or PSTN gateway 354/355. At optional steps 473 and 474, the authorized ES OCSP responder 146 may request/receive ES certificate from PSAP proxy 364 or PSTN gateway 354/355. At step 476, PSAP proxy 364 or PSTN gateway 354/355 validates ES trust with VoIP server 384/344. At step 480, an end-to-end ES CoT between user terminal/MS 216 and PSAP 364 is validated.

Figure 5:
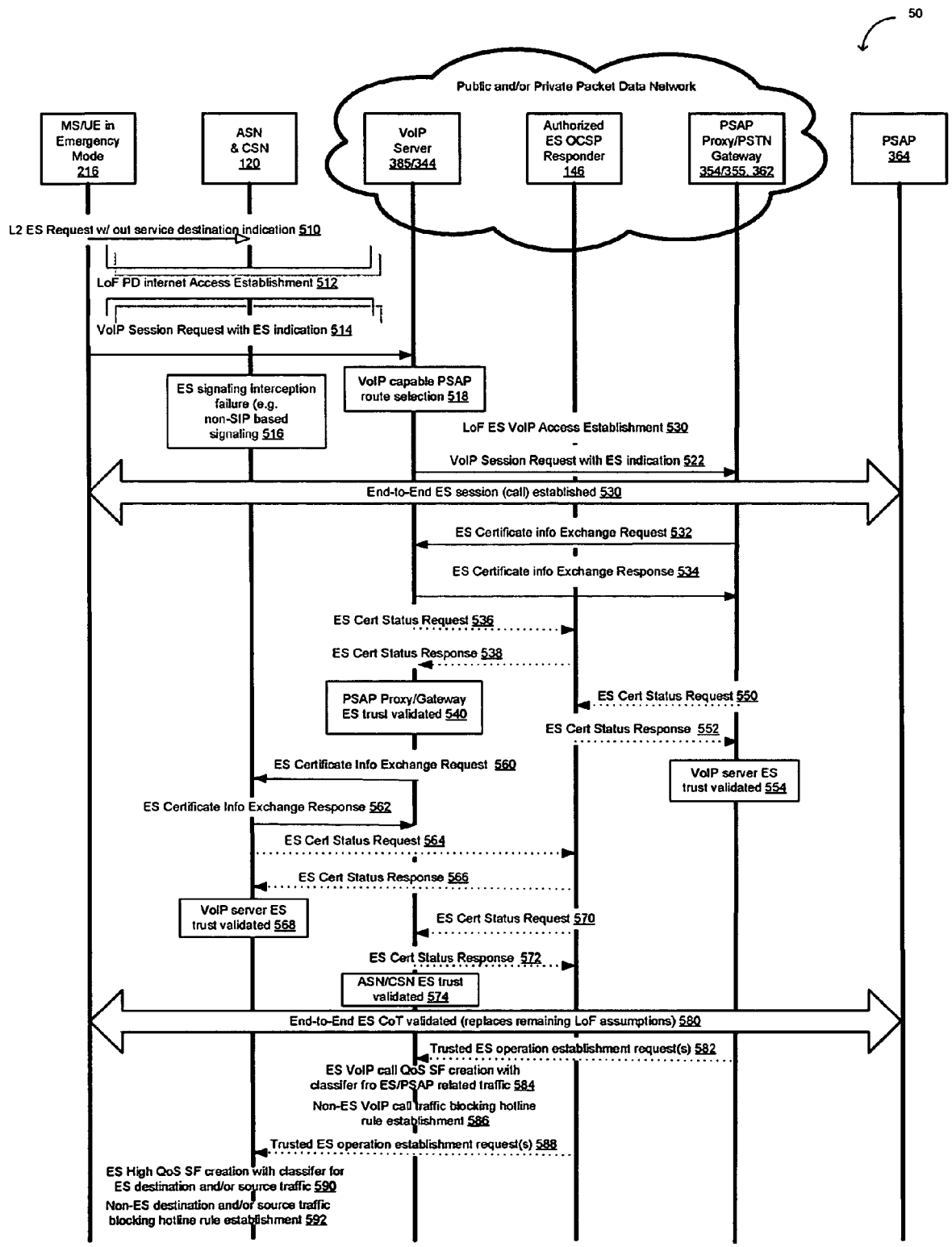
FIG. 5 illustrates a message flow diagram of the messages utilized to establish an ES CoT in a downlink manner from the PSAP gateway to the serving ASN/CSN of the MS, triggered by the PSAP or PSAP gateway, and the request messaging utilized to trigger ES operation executions at termination points along the established ES CoT in accordance with one example embodiment

FIG. 5 illustrates a message flow diagram of the messages utilized to establish an ES CoT in a downlink manner from the PSAP gateway to the serving ASN/CSN of the user terminal/MS, triggered by the PSAP or PSAP gateway, and the request messaging utilized to trigger ES operation executions at termination points along the established ES CoT in accordance with one example embodiment. At step 510, the user terminal/MS 216 in the emergency mode establishes layer 2 (MAC layer) connection with the ASN/CSN 120 by sending an ES request with optional service destination X indication. At step 512, user terminal/MS 216 performs LoF PD internet access establishment. At step 514, user terminal/MS 216 sends to the VoIP servers 384/344 VoIP session request with ES indication. At step 516, ASN/CSN signals ES interception failure (e.g., non-SIP based signaling). At step 518, VoIP server 384/344 selects VoIP capable PSAP router. At step 520, the authorized ES OCSP responder 146 establishes a LoF ES VoIP access 430 to PSAP Proxy 362 or PSTN gateway 354/355. At step 522, VoIP server 384/344 sends a VoIP session request with ES indication to the PSAP proxy 362 or PSTN gateway 354/355. At step 530, an end-to-end ES session call between the user terminal/MS 216 and PSAP 364 is established. At steps 532 and 534, VoIP server 384/344 exchanges ES certification information with PSAP proxy 364 or PSTN gateway 354/355 and, at steps 536 and 538, may optionally request/receive ES certificate status info from the Authorized ES OCSP responder 146. At step 540, VoIP server 384/344 validates ES trust with PSAP proxy 364 or PSTN gateway 354/355. At optional steps 550 and 552, the authorized ES OCSP responder 146 may request/receive ES certificate from PSAP proxy 364 or PSTN gateway 354/355, whereby at step 554, the ES trust with VoIP server 385/344 is validated. At steps 560 and 562, VoIP server 384/344 requests/receives ES certificate inform from ASN/CSN 120. At optional steps 564 and 566, ASN/CSN 120 requests and receives from the authorized ES OSCP responder 146 ES certificate status information. At step 568, ASN/CSN 120 validates VoIP server 385/344 ES trust. At optional steps 570 and 572, VoIP server 385/344 requests and receives ES certificate status info from the authorized ES OCSP responder 146. At step 574, VoIP server 384/344 validates ES trust with ASN/CSN 120. At step 580, an end-to-end ES CoT between user terminal/MS 216 and PSAP 364 is validated. At step 582, PSAP proxy 364 or PSTN gateway 354/355 requests establishment of trusted ES operation with VoIP server 384/344. At step 584, VoIP server creates ES VoIP call QoS SF with classifier for ES/PSAP related traffic. At step 586, VoIP Server establishes non-ES VoIP call traffic blocking hotline rules. At step 588, the authorized ES OCSP responder 146 requests establishment of trusted ES operation with ASN/CSN 120. At step 590, ASN/CSN creates ES high QoS SF with classifier for ES destination and/or traffic. At step 592, ASN/CSN establishes non-ES destination and/or source traffic blocking hotline rules.

Figure 6:
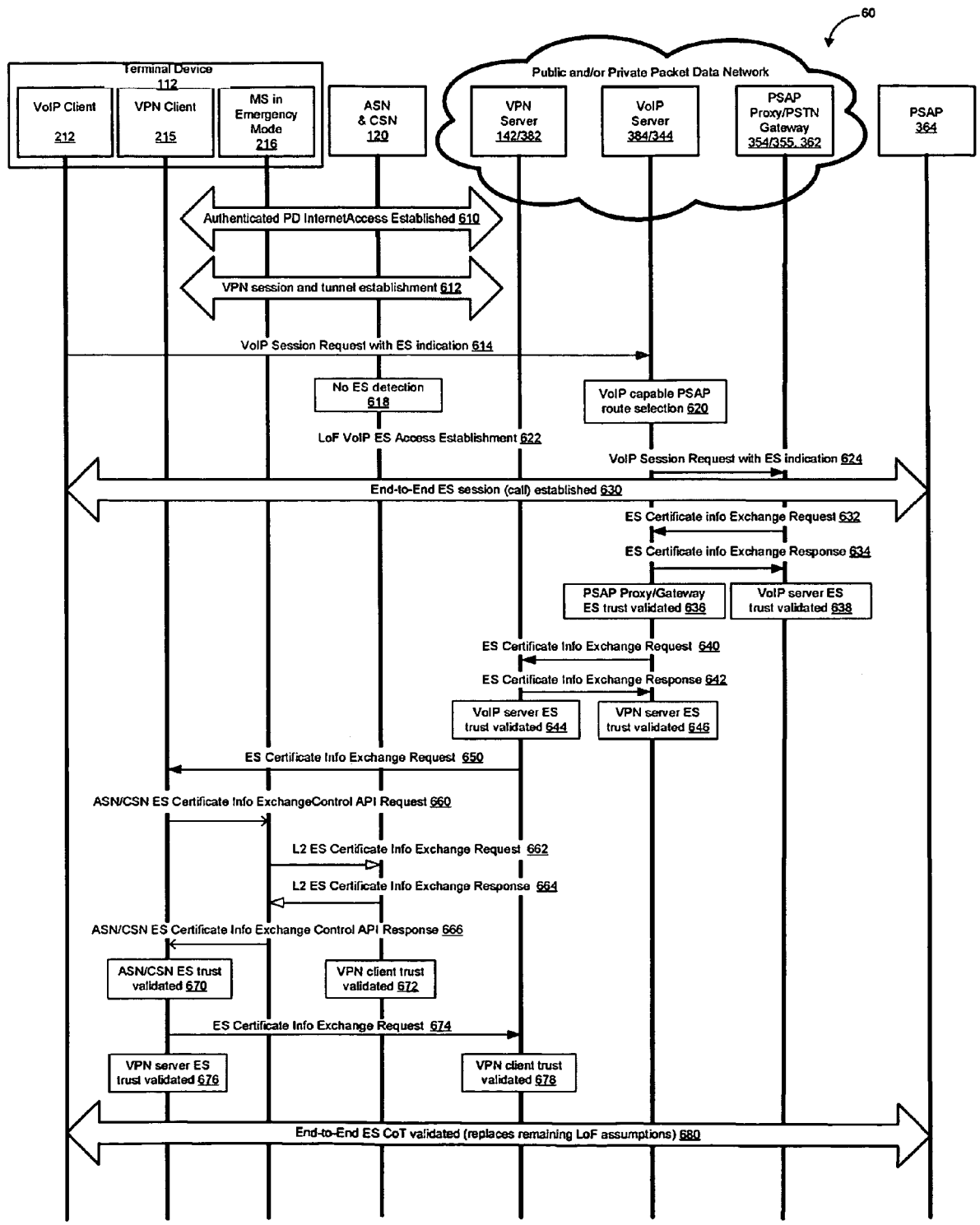
FIG. 6 illustrates a message flow diagram of the messages utilized to establish an ES CoT in a downlink manner for which involves the inclusion of a VPN client and server in the ES CoT and the relay of ES CoT establishment messaging to the serving ASN/CSN through the terminal device that terminates the VPN tunnel in use in accordance with one example embodiment.

FIG. 6 illustrates a message flow diagram of the messages utilized to establish an ES CoT in a downlink manner for which involves the inclusion of a VPN client and server in the ES CoT and the relay of ES CoT establishment messaging to the serving ASN/CSN through the terminal device that terminates the VPN tunnel in use in accordance with one example embodiment. At step 610, end-user terminal device 112 establishes an authenticated packet data (PD) internet access to the public and/or private networks 140/180. At step 612, terminal device 112 establishes VPN session and tunnel with the public and/or private network. At step 614, the VoIP client 212 sends a VoIP session request with ES indications to VoIP server 384/344. ASN/CSN 120 does not detect emergency session request at step 618. At step 626, VoIP server 384/344 selects VoIP capable PSAP route. At step 622, LoF VoIP emergency session access is established. At step 624, VoIP server 384/344 requests from PSAP proxy 362 or PSTN gateway 354/355 a VoIP session with ES indicates. At step 630, an end-to-end ES between user terminal/MS 216 and PSAP 364 is established. At steps 632 and 634 VoIP server 384/344 requests/receives ES certificate information from PSAP proxy 362 or PSTN gateway 354/355, thereby validating trust between VoIP server and PSAP proxy or PSTN gateway at steps 636 and 638. At steps 640 and 642, VoIP server 384/344 requests/receives ES certificate information from VPN server 142/382, thereby validating trust between VoIP and VPN servers at steps 644 and 646. At step 650, VPN server 142/382 requests ES certificate info exchange with VPN client 215. At step 660, VPN client sends an ASN/CSN ES certificate info exchange control API request to mobile station 216, which at steps 662 and 664, requests/receives ES certificate info from ASN/CSN 120. At step 666, MS 216 returns ASN/CSN ES certificate info to the VPN client. As such, at steps 670 and 672, the ES trust between ASN/CSN 120 and VPN client 215 has been validated. At step 674, VPN client sends a ES certificate info exchange request to VPN server 142/382, thereby the ES trust is validated between VPN client and server. At step 680, an end-to-end ES CoT between user terminal/MS 216 and PSAP 364 is validated.

Figure 7:
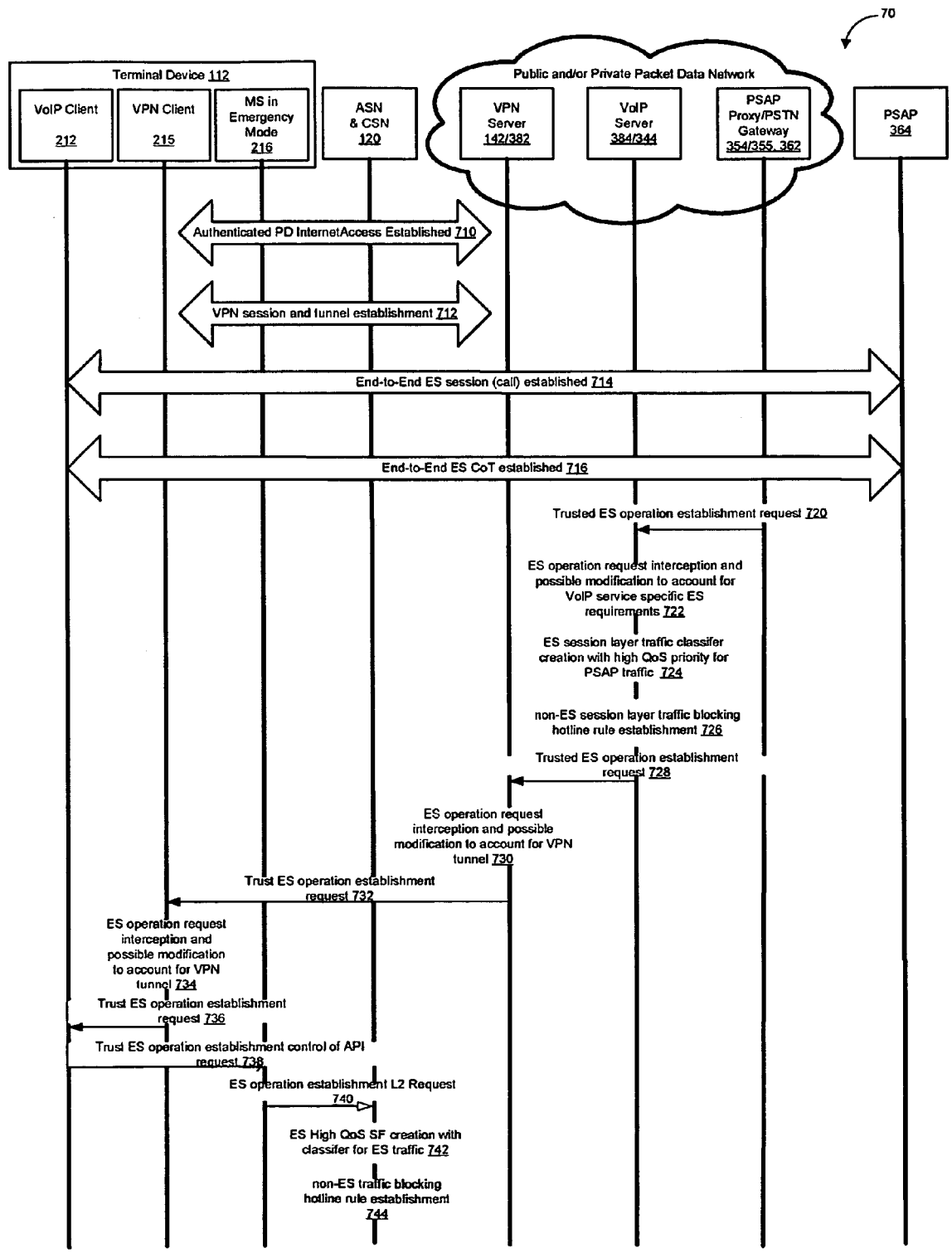
FIG. 7 illustrates a message flow diagram of the messages utilized to trigger ES operations along an established ES CoT that require interception and modifications of the ES operation requests by VPN CoT components to adjust the requests to take into account the routing impact of the VPN tunnel in use in accordance with one example embodiment.

FIG. 7 illustrates a message flow diagram of the messages utilized to trigger ES operations along an established ES CoT that require interception and modifications of the ES operation requests by VPN CoT components to adjust the requests to take into account the routing impact of the VPN tunnel in use in accordance with one example embodiment. At step 710, end-user terminal device 112 establishes an authenticated packet data (PD) internet access to the public and/or private networks 140/180. At step 712, terminal device 112 establishes VPN session and tunnel with the public and/or private network. At step 714, an end-to-end ES between user terminal/MS 216 and PSAP 364 is established. At step 716, an end-to-end ES CoT between user terminal/MS 216 and PSAP 364 is validated. At steps 720, PSAP proxy 362 or PSTN gateway 354/355 request for establishment of a trusted ES with VoIP server 384/344. At step 722, VoIP server intercepts the ES operation request and may modify it account for VoIP service specific ES requirements. At step 724, VoIP server creates a ES session layer traffic classifier with high QoS priority for PSAP traffic. At step 726, VoIP server establishes rues for non-ES session layer traffic blocking hotline. At step 728, VoIP server requests VPN server 142/382 to establish a trusted ES. At step 730, VPN server intercepts this request and may modify it to account for a VPN tunnel. At step 732, VPN server send a request for trusted ES establishment to VPN client 215. At step 734, VPN client intercepts this request and may modify it to account for a VPN tunnel. At step 736, VPN client sends the ES establishment request to VoIP client 212. At step 738, VoIP client send an API request for a trusted ES operation establishment to MS 216. At step 740, MS sends an ES operation establishment request to ASN/CSN 120. At step 742 ASN/CSN creates ESHSF with classifier for ES traffic. At step 744, ASN/CSN establishes rules for non-ES traffic blocking hotline.

Those of ordinary skill in the art will appreciate that systems and methods disclosed herein provide for IP-based Emergency Services with advantages that include unrestricted, seamless, ubiquitous, and reliable end-to-end ES capabilities by ASN and CSN providers without compromising the security and reliability of the ASN or CSN. The disclosed systems and methods also provide reliable and flexible methods for determining and validating the trust between any service or proxy triggering an ES operation and the network elements responsible for the point of execution of the requested ES operation, as well as a reliable method to delivery an ES operation trigger request to an ASN when VPN tunneling or NAT techniques may be preventing the ASN from receiving the requests directly from ES servers, proxies or gateways.

In accordance with this disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Alternatively, the processes disclosed herein may be embodied in machine-executable instructions, which may be used to cause a general-purpose or special-purpose processor or logic circuits programmed with the instructions to perform the operations. Embodiments of the invention may be provided as a computer program product that may include a machine-readable medium having stored thereon instructions, which may be used to program a computer (or other electronic devices) to perform processes disclosed herein. The machine-readable medium may include, but is not limited to, optical and magneto-optical disks, ROMs, RAMs, EPROMs, EEPROMs or other type of medium for storing electronic instructions.

In the interest of clarity, not all of the features of the implementations described herein are shown and described. It will, of course, be appreciated that in the development of any such actual implementation, numerous implementation-specific devices must be made in order to achieve the developer's specific goals, wherein these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In addition, those skilled in the art will recognize that the invention is not limited to the embodiments described, but can be practiced with modification and alteration within the spirit and scope of the appended claims. The description is thus to be regarded as illustrative instead of limiting.

What is claimed is:

1. In a packet data telecommunication network serving one or more end terminals and/or Mobile Stations (MSs), a method for establishing, managing, modifying, and terminating an End-to-End (E2E) Emergency Service (ES) Chain-of-Trust (CoT) from an Access Serving Network (ASN) and Connectivity Service Network (CSN) to a PSAP, PSAP proxy, or PSAP gateway, the method comprising:
   creating a trust relationship amongst components in the established ES CoT;
   allowing or validating the granting of any unauthenticated or unprovisioned ES network access and ES operation establishment, modification, and termination requests from amongst the components in an ES CoT based on the created trust relationship; and assisting a particular terminal/MS or ES network component attempting to establish an ES session between an ES user agent of the terminal/MS and a serving PSAP.

2. The method of claim 1 wherein the ES operation requested through the ES CoT is terminated and performed within one of the components in the CoT.

3. The method of claim 1 wherein the ES operation includes an establishment, modification, or termination of one or more network layer based Hotline rule operations used to block or restrict some or all non-ES based network layer traffic.

4. The method of claim 1 wherein the ES operation includes an establishment, modification, or termination of one or more network layer based high-QoS Service Flows and/or classifiers for ES network layer traffic.

5. The method of claim 1 wherein the ES operation includes an establishment, modification, or termination of one or more session and/or application layer based Hotline rule operations to block or restrict some or all non-ES based session and/or application layer traffic.

6. The method of claim 1 wherein the ES operation includes an establishment, modification, or termination of one or more session and/or application layer based high QoS Service Flows and/or classifiers for ES based session and application layer traffic.

7. The method of claim 1 wherein an ES operation request is sent from the terminal/MS associated with the establishing or established ES, a router or firewall providing ASN gateway access for the terminal/MS, or one of the components of the established CoT.

8. The method of claim 1 wherein the CoT establishment, modification, or termination request is sent from the terminal/MS associated with the establishing or established ES, a router or firewall providing ASN gateway access for the terminal/MS, one of the components of the established CoT, or a legacy PSTN based PSAP that may not be a direct component of the established ES CoT.

9. The method of claim 8 wherein the CoT is established or terminated in an uplink manner.

10. The method of claim 8 wherein the CoT is established or terminated in a downlink manner.

11. The method of claim 8 wherein the CoT is established or terminated in an intermediate manner.

12. The method of claim 8 wherein an ES CoT modification request is triggered by a handoff operation of a MS from a first serving ASN/CSN to a secondary serving ASN/CSN.

13. The method of claim 1 wherein a component in an establishing or established ES CoT can modify an ES operation request, through interception and alteration/extension to said ES operation request in order to take into account the impact the said component has on the end-to-end routing and characteristics of the data and control plane bearers associated with the established or establishing ES.

14. The method of claim 12 wherein the ES CoT component is a VPN server or client that alters or extends the content of an ES operation request to take into account the changes to the ES data and control plane bearer routing caused by the VPN tunneling of ES and non-ES traffic.

15. The method of claim 12 wherein the ES CoT component is a VoIP server/service or client.

16. The method of claim 12 wherein the ES CoT component is an Instant Messaging (IM) server/service or client.

17. The method of claim 12 wherein the ES CoT component is a real-time text server/service or client.

18. The method of claim 12 wherein the ES CoT component is an Internet Multimedia Service (IMS) based server/service or client.

19. The method of claim 1 wherein the components of an established ES CoT can include any networking component along the establishing or established ES control and data plane end-to-end link between an ASN/CSN and a PSAP that acts on the control and data plane traffic used for the CoT establishment, modification, or termination messaging as well as the ES operation request/response messaging to alter or extend the ES control plane route to achieve, maintain, and terminate the intended ES establishment.

20. The method of claim 19 wherein a component of an established ES CoT is a PSAP, PSAP gateway, or PSAP proxy.

21. The method of claim 19 wherein a component of an established ES CoT is a network service that support an ES capability server or a video conferencing server.

22. The method of claim 19 wherein a component of an established ES CoT is an IP Multimedia System (INIS) server component of a home or visited network or service provider.

23. The method of claim 19 wherein a component of an established ES CoT is a Policy Charging and Control (PCC) server component of a home network, visited network, or Application Service Provider (ASP).

24. The method of claim 19 wherein a component of an established ES CoT is a VPN server.

25. The method of claim 19 wherein a component of an established ES CoT is a VPN client.

26. The method of claim 19 wherein a component of an established ES CoT is a firewall.

27. The method of claim 19 wherein a component of an established ES CoT is a router using NAT.

28. The method of claim 19 wherein a component of an established ES CoT is a Customer Premises Equipment (CPE) device linking one or more terminals/MSs to an ASN over a Small Office Home Office (SOHO) or other local network.

29. The method of claim 19 wherein a component of an established ES CoT is an Emergency Services Routing Proxy Server.

30. The method of claim 19 wherein a component of an established ES CoT is an SIP server.

31. The method of claim 19 wherein a component of an established ES CoT is an SIP registrar.

32. The method of claim 19 wherein a component of an established ES CoT is an SIP proxy server.

33. The method of claim 19 wherein a component of an established ES CoT is a roaming ASN from a visited-network that can provide ES-only and/or general network connectivity access to a terminal/MS attempting to access a home-network ES.

34. The method of claim 1 wherein the ES CoT is established, modified, and terminated utilizing a Public Key Infrastructure (PKI) to allow for a component of an establishing or established ES CoT to authenticate another component to be added to the same ES CoT.

35. The method of claim 34 wherein the PKI provides a common format for public key certificates combined with a certification path validation algorithm to allow for a component of an establishing or established ES CoT to authenticate another component to be added to the same ES CoT.

36. The method of claim 35 wherein the common format for public key certificates and a certification path validation algorithm are provided through the use of X.509 digital certificates with a root certificate associated with a regional and/or world-wide ES component accreditation authority.

37. The method of claim 1 wherein the ES CoT is established, modified, and terminated utilizing a web-of-trust model to allow for a component of an establishing or established ES CoT to authenticate another component to be added to the same ES CoT.

38. The method of claim 37 wherein the web-of-trust model is based on Pretty Good Privacy (PGP) encryption.

39. The method of claim 37 wherein the web-of-trust model is based on OpenPGP or a future derivative.

40. The method of claim 1 wherein the established ES CoT is used to verify and/or guarantee the authenticity of the ES operation requestor and the validity of the ES operation contents being requested to be only for a valid ES purpose.

41. The method of claim 1 wherein the established ES CoT is used to guarantee the message integrity of all ES request/response and CoT modification/termination messaging sent and received amongst the members of the ES CoT.

42. The method of claim 1 wherein the established ES CoT is used to guarantee the confidentiality of all ES operation requests and responses and CoT modification and termination messaging sent and received amongst the members of a particular ES CoT.

43. The method of claim 1 wherein a terminal/MS, CPE, VPN client, ES user agent, or other general user agent is used to relay ES CoT management messaging, ES operation requests/responses, and/or other general messaging to/from the ASN over the MAC layer interface between the terminal/MS and ASN to overcome the inability of the ASN/CSN to receive and respond to these messages directly due to a VPN tunnel that terminates in a terminal/MS, CPE, VPN client, ES user agent, or other general user agent.

44. The method of claim 1 wherein the ASN/CSN allows a leap-of-faith unauthenticated and/or unsubscribed grant of ES level network access to the terminal/MS to attempt the establishment of an ES session with the expectation a ES CoT will be established shortly thereafter that allows the ASN/CSN to validate or invalidate the authenticity of the attempted ES session by the terminal/MS.

45. The method of claim 44 wherein the ASN/CSN and/or associated backend network components can collect and keep records of invalid ES session attempts by the terminal/MS that can be used for purposes such as blacklisting, certificate revocation list additions, and/or legal action against the owner and/or subscriber of the terminal/MS.

* * * * *